Jan. 8, 1935.    H. G. KNODERER    1,987,446
OUTLET BOX
Filed March 18, 1933
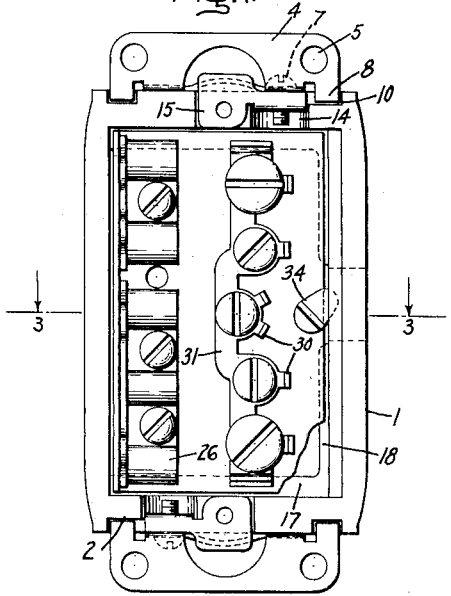
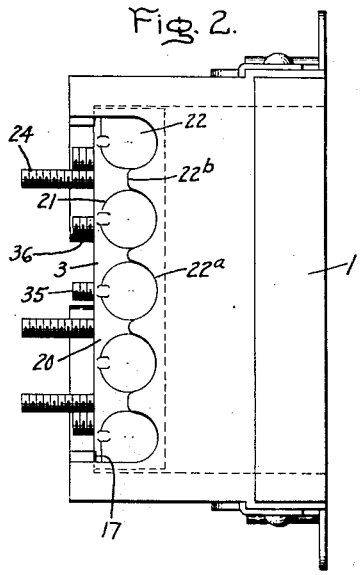
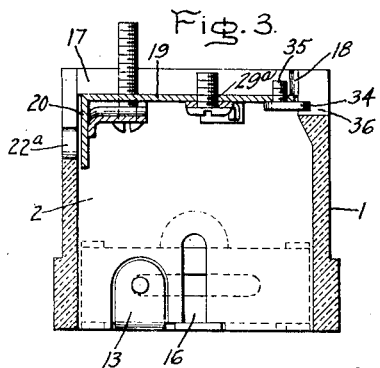
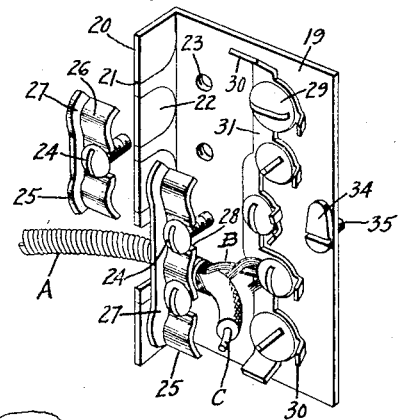
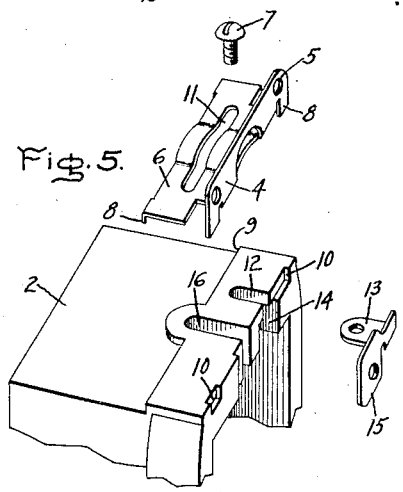
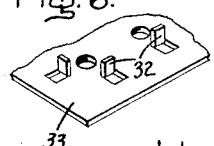
Inventor:
Homer G. Knoderer,
by Charles E. Mullen
His Attorney.

Patented Jan. 8, 1935

1,987,446

UNITED STATES PATENT OFFICE 1,987,446

OUTLET BOX

Homer G. Knoderer, Fairfield, Conn., assignor to General Electric Company, a corporation of New York Application March 18, 1933, Serial No. 661,525

15 Claims. (Cl. 247—15)

The present invention relates to outlet boxes and especially to outlet boxes such as are used for house wiring.

One object of the invention is to provide an improved construction and arrangement of an outlet box whereby the major portion of the box is well adapted to be formed from insulating material, thus providing a box having a dead front.

A further object of the invention is to provide an outlet box which may be made relatively shallow.

Another object of the invention is to provide an outlet box wherein the electrical connections of the wires in the box may be made in front of the box.

Other objects of the invention and the advantages thereof are pointed out more fully in the following specification wherein there is described an embodiment of the invention.

In the drawing, Fig. 1 is a top view of an arrangement embodying the invention; Fig. 2 is a side view of the arrangement; Fig. 3 is a sectional view taken on the line 3—3, Fig. 1; Fig. 4 is a perspective view of a base plate; Fig. 5 is an exploded perspective view of a part of the box and the fastening for the box, and Fig. 6 is a view of a modification.

Referring to the drawing, the box comprises side and end walls 1 and 2 respectively and a base plate 3. The side and end wall may be made of an insulating material such as a suitable moulding compound. By making the side and end walls of the box of insulating material, there is provided a box having a "dead" front, that is, a front of insulating material.

For attaching the box to a wall, there is provided at the end of the box outwardly projecting flanges 4 provided with openings 5 to receive fastening screws. The flanges 4 are fastened to the box by integral plates 6 which are held in place by screws 7. Plates 6 are provided at their corners with lugs 8 which engage beneath shoulders 9 and in recesses 10 at the ends of the box. Flanges 4 extend at right angles to plates 6. By reversing the plates, the flanges may be located either at the edge of the box or spaced from the edge a distance equal to the width of the plate. Screws 7 extend through slots 11 in plates 6 and through slots 12 in the box ends and are threaded into tapped openings in lugs 13 located in recesses 14 in the inner surfaces of the end walls. Formed integral with lugs 13 are ears 15 which extend along the top surfaces of the end walls and are provided with tapped openings to receive screws for fastening an electrical device in the box. Beneath ears 15 and in line with the tapped openings therein are slots 16 formed in the edge of the end walls of the box to accommodate the fastening screws. Slots 11 are of sufficient length so that when the positions of the plates are reversed, screws 7 may still enter slots 12 by being moved to the other ends of slots 11.

By the foregoing construction, it will be seen that a single screw serves to fasten in place both a flange 4 and an ear 15.

The inner ends of the end walls of the box are provided with inwardly projecting ledges 17 and one side wall is provided with an inwardly projecting ledge 18 upon which the base plate 3 rests. The base plate comprises a bottom wall 19 provided along at least one edge with a right angular flange 20, the flange being relatively narrow. In the present instance, a flange 20 is shown as extending along one longitudinal edge of the bottom wall only, but flanges along one or more of the other edges may be provided if found desirable. Flange 20 is provided with weakened lines 21, thus providing pieces 22 which may be removed readily to form slots or openings in the flange. These are in the nature of "twist outs" or "knockouts" such as are provided usually in outlet boxes to form openings for the passage of the cables or conductors. The rear edge of the side wall of the box adjacent to flange 20 is cut away as is indicated at 22ᵃ for the entrance of the wires or cables into the box. The edge of the cut away portion is shaped to provide curved openings or recesses, the edges of which coincide with weakened lines 21. Between the curved recesses are projecting teeth 22ᵇ which are in line with the portions of the flange between the twist outs 22.

In bottom wall 19 adjacent to flange 20 are a series of tapped holes 23 to receive screws 24 for holding in place cable clamps 25. The cable clamps comprise metal strips having curved portions 26 adapted to engage a cable and flanges 27 to stiffen the strips. Between the curved portions are slots 28 through which screws 24 extend. Screws 24 are of a length sufficient to permit them to be screwed outwardly until the heads of the screws are beyond the upper edge of the side flange 20. When in this position, the cable clamps can be removed readily from the screws. In Fig. 4, A indicates a cable clamped in position by one of the clamps, B indicates the grounded conductor of the cable, and C indicates the other conductor.

In bottom wall 19 are a number of openings as 29ᵃ in which are located binding screws 29.

Adjacent to the binding screws are upwardly projecting lugs 30 which serve to hold the conductors under the heads of the binding screws. Lugs 30 may be formed in any suitable manner. For example, they may be struck up from the material of the bottom wall or they may be formed of a separate piece on the bottom wall. In Figs. 1 to 5 there is shown a separate piece 31 which is held by the heads of the binding screws 29 and formed integral with the edge of which are lugs 30. In Fig. 6 is shown an arrangement wherein the lugs indicated as 32 are struck up from the material of the bottom wall indicated at 33.

The base plate is locked in position on ledges 17 and 18 by means of a tongue 34 covered by a screw 35 which threads into a tapped hole in the base plate and is adapted to be turned into engagement with a recess 36 in the side wall of the box.

Base plate 3 is of a size such that it may be removed from and inserted into the box through the open front of the box.

In the use of the invention, the box is mounted in the wall in the normal manner by means of flanges 4 and the wires are brought into the box through the open bottom, the base plate not being in place at this time. The cables are brought out through the front of the box. The workman then removes from the base plate "twist outs" corresponding to the number of cables and lays the cables in the slots formed in flange 20 by the removal of the twist outs. The one wire of end cable, i. e., the grounded wire, is then connected to the base plate by a binding screw 29. Following this, the cable clamps 25 which may have been previously removed in the manner already described, are put into position and screwed down by screws 24 to clamp the cables to the base plate. The base plate is now inserted into the box, the excess lengths of the cables being pushed back through the bottom of the box. The base plate is located against the edges 17 and 18, after which the tongue 34 is turned to engage slot 36 to lock the base plate in position. When the base plate is in position, the recesses 22ª cooperate with the slots formed by the removal of the knockouts to provide openings for admitting the conductors to the interior of the box.

With the above described arrangement, it will be seen that the connection of the conductors to the base plate may be made in front of the box and before the base plate is inserted into the box. This has the advantage that the connections can be made more quickly and conveniently, thus saving time of the workman. Also the arrangement whereby the grounded or "identified" conductors are connected to the base plate insures a good ground connection.

Since the cables are brought in through the side of the box and since any excess cable is pushed out through the bottom of the box when the base plate is positioned, thus avoiding the necessity of coiling any excess cable in the box itself, the box may be made relatively shallow so that it is well adapted for use in relatively thin walls. This is of substantial advantage since in modern constructions relatively thin walls are often encountered.

Since the base plate is separate from the surrounding walls of the box, such surrounding walls may be made readily from insulating material, thus insuring the provision of a box with a "dead" front.

What I claim as new and desire to secure by Letters Patent of the United States, is:

1. An outlet box having side walls one of which is provided with a plurality of openings and a metal base plate removable through the front of the box and adapted to be located within the box to provide a bottom wall for the box, said plate being provided with openings which form with the openings in the side wall passages for admitting conductors into the interior of the box.

2. An outlet box having side walls one of which is provided with a plurality of openings, a metal base plate removable through the front of the box and adapted to be located within the box to provide a bottom wall for the box, and a flange on the base plate provided wth openings which form with the openings in the side wall passages for admitting conductors into the interior of the box.

3. An outlet box having side walls one of which is provided with a plurality of openings, a metal base plate removable through the front of the box and adapted to be located within the box to provide a bottom wall for the box, and a flange on the base plate having removable parts adapted to provide openings which form with the openings in the side wall passages for admitting conductors into the interior of the box.

4. An outlet box having side walls one of which is cut away at its bottom portion to provide a plurality of spaced recesses, and a metal plate removable through the front of the box and adapted to be located within the box to form a bottom wall for the box, said base plate being provided with openings which form with the recesses in the side walls passages for admitting conductors into the interior of the box.

5. An outlet box having side walls one of which is provided with a plurality of openings, a metal base plate removable through the front of the box and adapted to be located within the box to provide a bottom wall for the box, said plate being provided with openings which form with the openings in the side wall passages for admitting cables into the interior of the box, and means for fastening the base plate within the box.

6. An outlet box having side walls one of which is provided with a plurality of openings, a metal base plate removable through the front of the box and adapted to be located within the box to provide a bottom wall for the box, said plate being provided with openings which form with the openings in the side wall passages for admitting cables into the interior of the box, means for clamping each of the cables to the base plate, and means for connecting a conductor of each cable to the base plate.

7. An outlet box having side walls of insulating material, one of said walls being provided with a plurality of openings, a metal base plate removable through the front of the box and adapted to be located within the box to provide a bottom wall for the box, said base plate being provided with openings which form with the openings in the side wall passages for admitting cables into the interior of the box, means for clamping each of the cables to the base plate, and means for connecting a conductor of each cable to the base plate.

8. An outlet box having side walls one of which is provided with a plurality of openings, a metal plate removable through the front of the box and adapted to be located within the box to provide a bottom wall for the box, said base plate being provided with openings which form with the openings in the side wall passages for admitting cables into the interior of the box, means for clamping each of the cables to the base plate, binding screws for connecting a conductor of each cable to the base plate, and means providing projections adjacent to the binding screws.

9. An outlet box comprising side walls, a base plate separate from the side walls and formed of metal for forming the bottom wall of the box, said base plate being removable through the front of the box, means for clamping a cable to the base plate, and means for connecting a conductor to the base plate.

10. An outlet box having a bottom wall separate from the side walls, said bottom wall being removable through the front of the box, means for clamping cables to said bottom wall, and means fastening the bottom wall in the box.

11. An outlet box comprising side walls of insulating material, a base plate separate from the side walls and formed of metal for forming the bottom wall of the box, said base plate being removable through the front of the box, means for clamping a cable to the base plate and means for connecting a conductor to the base plate.

12. An outlet box comprising side walls of insulating material, one of said side walls having an opening along its rear edge for the passage of cables, a base plate separate from the side walls and formed of metal for forming the bottom wall of the box, said base plate being removable through the front of the box, means for clamping a cable to the base plate, and means for connecting a conductor to the base plate.

13. An outlet box comprising side walls, a base plate separate from the side walls and formed of metal for forming the bottom wall of the box, said base plate being removable through the front of the box and having a flange with parts which may be removed to form passages for cables, means for clamping cables to the base plate, and means for connecting a conductor to the base plate.

14. An outlet box comprising side walls of insulating materials, a base plate separate from the side walls and formed of metal for forming the bottom wall of the box, said base plate being removable through the front of the box and having a flange with parts which may be removed to form passages for cables, means for clamping cables to the base plate, and means for connecting a conductor to the base plate.

15. An outlet box having a bottom wall separate from the side walls, said bottom wall being removable through the front of the box, means for clamping cables to said bottom wall, binding screws for connecting conductors to the bottom wall, means providing projections adjacent said binding screws and means for fastening the bottom wall in the box.

HOMER G. KNODERER.